United States Patent [19]
Bott

[11] 3,840,250

[45] Oct. 8, 1974

[54] GRAB RAIL FOR PICKUP TRUCK

[76] Inventor: John A. Bott, 931 Lake Shore Dr., Grosse Pointe Shores, Mich. 48236

[22] Filed: May 14, 1973

[21] Appl. No.: 360,095

[52] U.S. Cl. .......................... 280/179 R, 248/226 R
[51] Int. Cl. ............................................. B60p 7/00
[58] Field of Search ............ 280/179 R; 224/42.1 D, 224/42.1 E, 42.1 F, 42.1; 105/382, 340; 248/226 R

[56] References Cited
UNITED STATES PATENTS

| | | | |
|---|---|---|---|
| 2,688,289 | 9/1954 | Sterling | 280/179 R UX |
| 3,330,454 | 7/1967 | Bott | 224/42.1 E |
| 3,351,356 | 11/1967 | Clark et al. | 280/179 R |
| 3,674,304 | 7/1972 | Swanson | 296/43 |
| 3,722,910 | 3/1973 | Heckenlaible | 280/179 R |
| 3,764,177 | 10/1973 | Woodward | 296/43 |

*Primary Examiner*—Robert B. Reeves
*Assistant Examiner*—David A. Scherbel
*Attorney, Agent, or Firm*—Harness, Dickey & Pierce

[57] ABSTRACT

A pair of grab rail assemblies are mounted on the quarter panels of a pickup truck. Each assembly includes a rail and three supports for the rail. The top of each quarter panel has three longitudinally spaced sockets formed in it. One rail support is mounted over each socket and is held in place by an anchor inserted into the socket. During installation of the supports the anchors are held in place by molded plastic retainers which also function as mounting pads for the rail supports.

10 Claims, 7 Drawing Figures

PATENTED OCT 8 1974　　　　　　　　　3,840,250

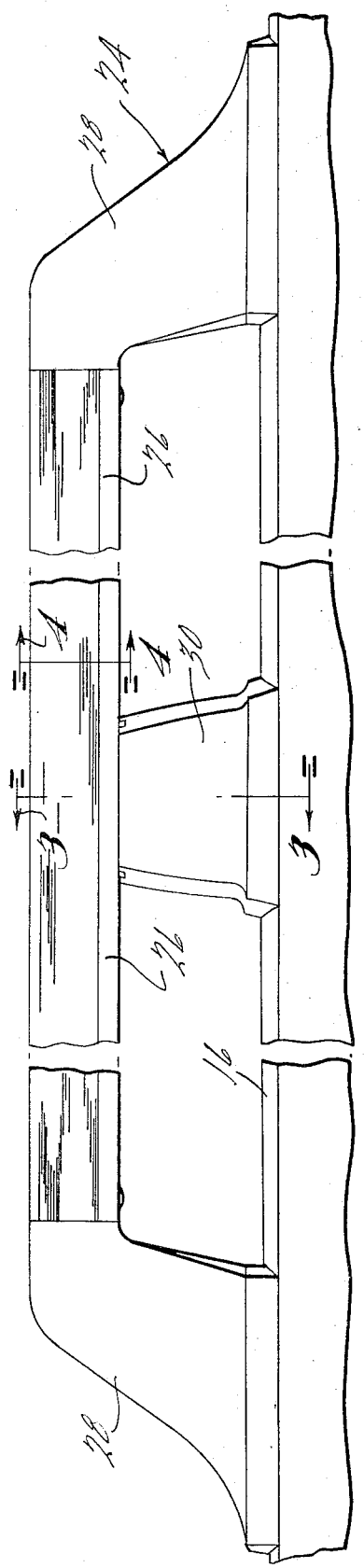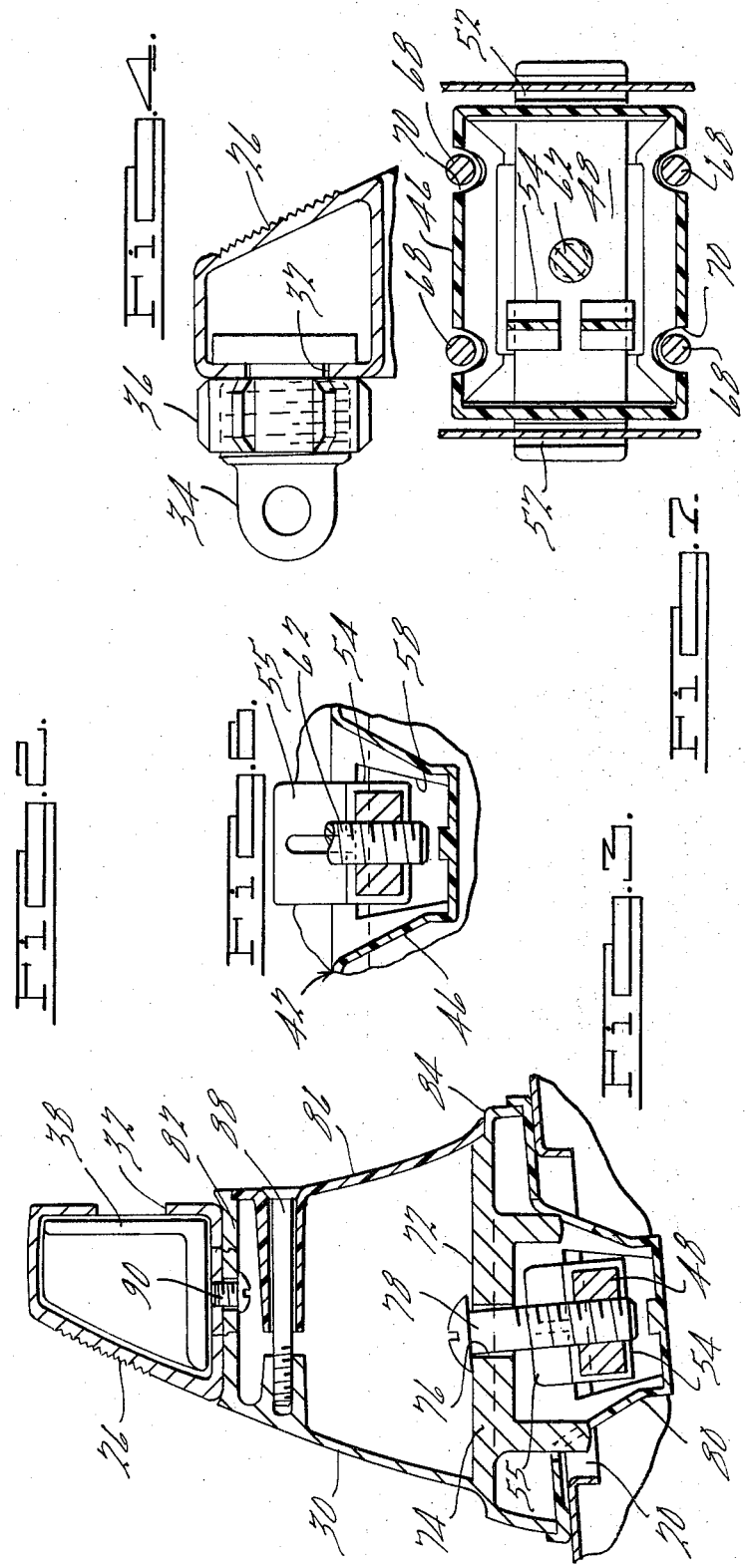

GRAB RAIL FOR PICKUP TRUCK

SUMMARY OF THE INVENTION

Various accessory equipment has been utilized with pickup trucks to assist in the retention of articles being transported on the bed of the truck. One of such accessories is a grab rail assembly in which longitudinally extending rails having supports are mounted on portions of the truck body on the opposite sides of the cargo bed. The supports have previously been held in place by self-tapping screws threaded into holes specially drilled in the truck body for their reception. The portions of the body on which the supports are mounted are normally called "quarter panels", including inner quarter panels and outer quarter panels. Pickup truck quarter panels are frequently made with sockets or pockets in their upper surfaces for the reception of wooden stakes or the like. Stakes are often inserted in the sockets by truck owners to build high walls on the sides of the bed, which aid in confining bales of hay or similar high loads.

The present invention relates to a grab rail assembly which is secured in place on the sidewall structure of a truck body by means of special anchors inserted into the conventional sockets thereof. The anchors engage shoulder-like edges of the body sheet metal on opposite sides of the sockets into which they are inserted and they are provided with tapped holes to receive large screws connected to the rail supports. Thus, the rail supports are held in place by the anchors and the rail supports support the rails. The rails, in turn, may carry eyelets or other devices to receive tie-down ropes. The present invention is characterized by the use of such anchors and further by the use of novel anchor retainers which also function as mounting pads for the rail supports.

It is an object of the present invention to provide a grab rail assembly which may be installed on and removed from the sidewalls of a pickup truck body without having to drill supplementary holes in the truck body or otherwise making deformations or alterations in the truck body which would be unsightly after the removal of the grab rail assembly. Thus, a truck owner may desirably remove his grab rail assembly to permit installation of a camper body on the bed or to permit him to keep his grab rail assembly when he sells the truck.

It is a further object of the present invention to provide a grab rail assembly which is conventionally installed on and removed from a truck body, which is sturdy and durable in construction, which may be manufactured at a reasonable cost, and which is attractive in appearance.

DESCRIPTION OF THE VIEWS OF THE DRAWING

FIGS. 3 and 4 are enlarged sectional views of the structure illustrated in FIG. 2 taken along the lines 3—3 and 4—4 thereof, respectively;

FIG. 5 is an enlarged sectional view of the structure illustrated in FIG. 1 taken along the line 5—5 thereof; and FIGS. 6 and 7 are sectional views of the structure illustrated in FIG. 5 taken along the lines 6—6 and 7—7 thereof, respectively.

DESCRIPTION OF THE PREFERRED EMBODIMENTS

Figure 1:
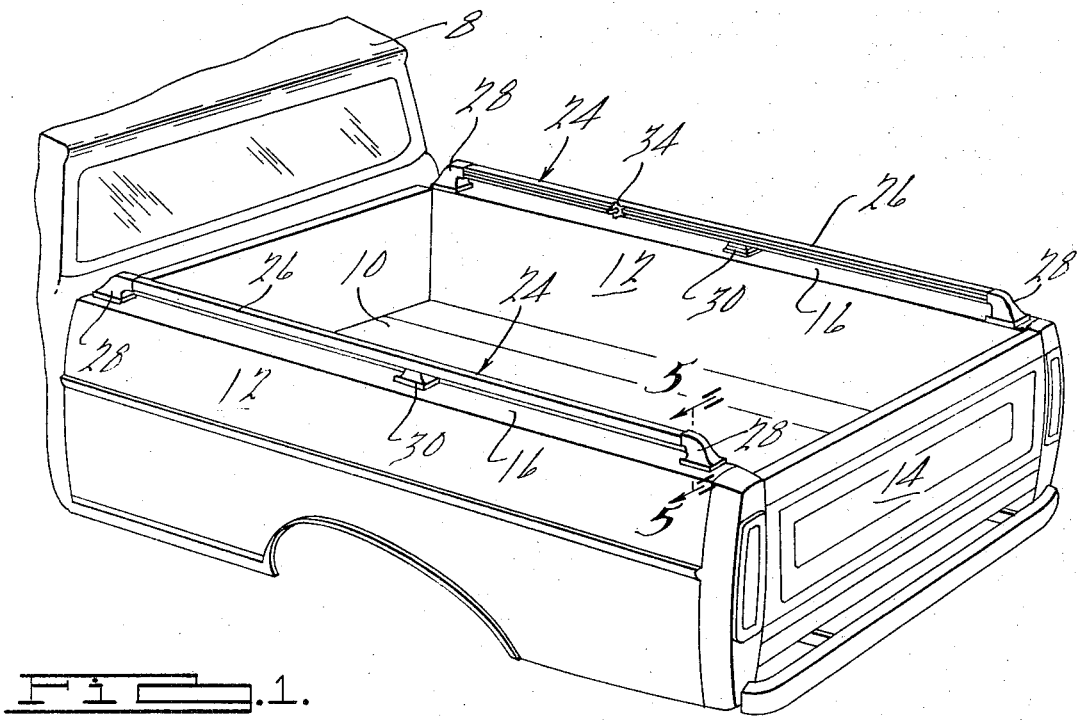
FIG. 1 is a fragmentary perspective view of a pickup truck body having mounted thereon grab rail assemblies embodying the principles of the present invention.
Figure 2:
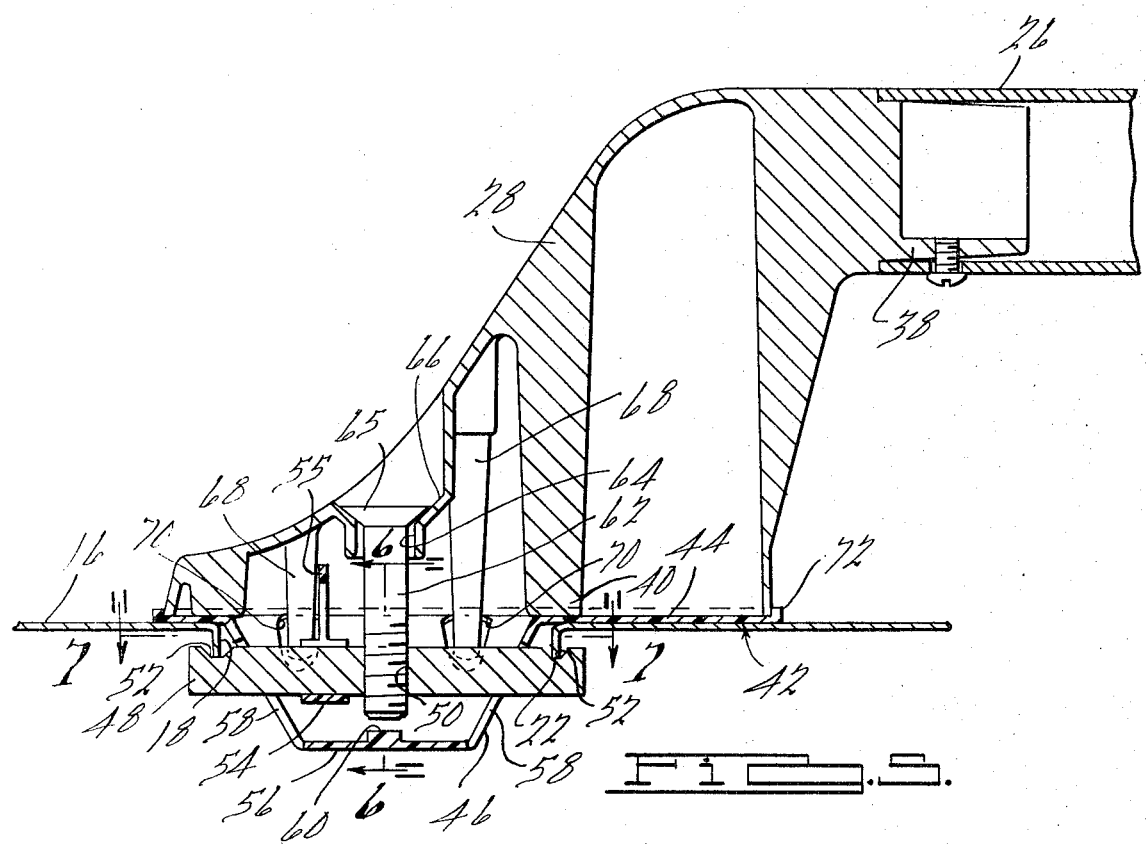
FIG. 2 is an enlarged broken side elevational view of a grab rail assembly illustrated in FIG. 1.

FIG. 1 illustrates a pickup truck body having a cab 8 and a cargo bed 10. The truck body further includes sidewalls 12 on opposite sides of the bed 10 and a tailgate 14 at the rear end thereof.

The outer surface of the truck sidewall 12 may be termed an outer quarter panel. This outer quarter panel 12 is turned inwardly at its upper end to define a generally planar, horizontal, upwardly facing mounting surface 16. The mounting surface 16 is provided with a pair of sockets 16 at the opposite ends thereof and a socket 20 spaced between the sockets 18. The sockets 18 and 20 have traditionally served to receive stakes, posts or the like with which the truck owner may improvise upward extensions of the sidewalls 12 to restrain high loads from lateral movement. It will be seen that the sockets 18 terminate in downwardly facing edges 22 which define shoulder means on the opposite sides of the sockets 18.

Positioned on the mounting surfaces 16 are a pair of grab rail assemblies 24 of complementary but otherwise identical configuration. Each grab rail assembly 24 includes a horizontal longitudinally extending rail 26, a pair of end stanchions or rail supports 28 and a middle stanchion or rail support 30. The rails 26 are of channel-shaped configuration having inwardly open slots 32 accommodating eyelet members 34 which may be slid up and down the rails and clamped in any desired position thereon by nuts 36. The eyelet members 34 serve to receive ropes by which cargo may be tied in place on the bed 10.

The cross sectional configuration of the end supports 28 may be seen in FIG. 5. The end supports 28 are die cast metal members each having a tongue 38 telescopically interfitted in one end of a rail 26. A base or lower portion 40 of each support 28 rests on a molded plastic anchor retainer indicated generally at 42. Each anchor retainer 42 includes a thin flat gasket or mounting pad portion 44 lying on a mounting surface 16 in an annular area surrounding a socket 18. Each retainer 42 also has a pocket 46 depending into a socket 18. The pocket 46 serves to support and position an anchor 48 during the installation of the rail assembly 24 on the truck.

The anchors 48 for each of the six supports 28, 30 are of identical construction and will be seen to comprise an elongated generally flat metallic member of greater length than width and provided with a threaded hole 50 extending vertically therethrough. Grooves 52 are formed in the upper surface of the anchor 48 at the opposite ends thereof in positions to engage the shoulder means 22. A plastic handle member 54 is fitted over each anchor 48 in a position offset from the opening 50 and provides a tab 55 by which the anchor 48 may be manually gripped and inserted into socket 18.

It will be seen that the pocket 46 has a bottom wall 56 and large openings 58 at its opposite ends to permit the anchor 48 to project therethrough. Thus, the grooves 52 of the anchor 48 will lie outside the confines of the pocket 46 immediately below the edges defining the shoulder means 22.

In mounting the rail supports 28, the anchor retainers 42 are first positioned on the mounting surfaces 16 with their pocket projecting into the openings 18. The anchors 48 are then grasped by the tabs 55 and lowered into the pockets 46 so that their opposite ends project through the openings 58 and so that the threaded hole 50 of each anchor is brought into registry with an upward projection 60 on the bottom wall 56. A large screw 62 is fitted through an opening 64 in each support 28 which is in alignment with the projection 60 of its anchor retainer 42. Thus, when the screw 62 is rotated it will thread into the opening 50 of its anchor 48 and lift the anchor up off of the projections 60 to bring the grooves 52 thereof into engagement with the adjacent shoulder means 22. The screw 60 has a Phillip-style head 65 which seats on an upwardly facing shoulder 66 surrounding the top end of the opening 64. When the head 65 of the screw 64 seats and the anchor 48 engages the shoulder means 22, each support member 28 will have a downward force applied thereto drawing it against the gasket portion 44 of its anchor retainer 42. As the screw 62 is being threaded into its anchor 48, the anchor will be kept from rotating by the engagement of the opposite sides thereof with the portions of the pocket 46 defining the openings 58. Thus, the anchor retainer 42 serves both to hold the anchor 48 in position prior to the engagement of the screw 62 therewith and it also prevents rotation of the anchor during the threading of the screw 62. Once the screw 62 is tightened the pocket 46 does not itself perform any function although the gasket portion 44 of the anchor retainer 42 does provide an insulating cushion between the support members 28 and the mounting surfaces 16. The mounting surfaces 16 are thus kept from being scratched by the support members 28.

The assembly of the support members 28 onto the anchor retainers 42 is further assisted by the formation of a plurality of downwardly projecting locating pins 68 on each support member 28 which are received in openings 70 formed in opposite sides of the pocket 46 of its retainer 42. The fit between the pins 68 and the openings 70 merely insures the proper alignment of the parts. This function is further assisted by the formation of an upwardly projecting lip 72 on the outer periphery of the gasket portion 44, which engages the outer periphery of the support member 28 at its base 40.

The cross sectional shape of the center support 30 will be seen in FIG. 3. Like the end supports 28, the center support is die cast and is of generally hollow configuration. The support 30 has a base wall 74 provided with an opening 76 through which a screw 78 projects so as to engage an anchor 48. The anchor 48 adjacent each of the center supports 30 is used in conjunction with an anchor retainer 80 which performs exactly the same function as the anchor retainer 42, although it is of slightly different shape in order to conform to the shape of the center support members 30. The principal difference between the support members 30 and the support members 28 is that the support members 30 have a top wall 82 which is positioned immediately beneath the rail 26, thus providing an obstruction above the head of the screw 78. However, access to the head of the screw 78 is achieved through an open inner side 84 of the side member 84 by means of a conventional right angle screwdriver (not shown).

The open side 84 is subsequently closed by an injection molded plastic cover plate 86 which is held in place by a screw 88 threaded into the support member 30. Prior to the installation of the cover plate 86, the open side 84 of the center support member 30 also provides access to a screw 90 by which the top wall 82 is fastened to the rail 26.

From the foregoing it will be apparent that the supports 28 and 30 may be installed on the mounting surfaces 16 without the necessity of drilling special holes in the mounting surfaces and without otherwise damaging or impairing the appearance of the mounting surfaces 16. Accordingly, the installation of the grab rail assemblies 24 is greatly simplified. Furthermore, the grab rail assemblies may be removed without detriment to the appearance of the truck, if their removal should be desired for any reason.

What is claimed is:

1. A support assembly for use on a vehicle body having an external mounting surface provided with an opening therein and inwardly facing shoulder means on opposite sides of said opening, said assembly including a support positioned over said opening, an anchor insertable through said opening, an anchor retainer supported on said mounting surface and having a pocket projecting into said opening and operable to support said anchor with its opposite ends disposed adjacent said shoulder means during the installation of said assembly and threaded fastener means extending through said opening and connecting said support to said anchor by threaded tightenable engagement therewith, said anchor retainer having a mounting pad portion positioned between said mounting surface and said support.

2. The structure set forth in claim 1 in which said retainer pocket is apertured to permit the opposite ends of said anchor to project beyond the confines of said pocket into alignment with said shoulder means.

3. The structure set forth in claim 1 including a projection on said pocket engageable in said anchor to locate said anchor with respect to said pocket during the installation of said support.

4. The structure set forth in claim 1 including a threaded opening in said anchor and a screw threaded into said opening connected to said support.

5. The structure set forth in claim 1 in which said shoulder means comprises a pair of inturned flanges on opposite sides of said opening.

6. The structure set forth in claim 1 including handle means on said anchor.

7. The structure set forth in claim 1 in which said anchor retainer has an integral mounting pad on which said support rests.

8. The structure set forth in claim 1 including a plurality of locating pins on said support engageable in openings formed in said anchor retainer to align said support with said anchor retainer.

9. The structure set forth in claim 1 including means operable to prevent rotation of said anchor relative to said anchor retainer about an axis perpendicular to said mounting surface.

10. A rail assembly for use on a vehicle body having an external mounting surface provided with an opening therein and inwardly facing shoulder means on opposite sides of said opening, said rail assembly including a rail, a support positioned over said opening and at least partially supporting said rail, an anchor insertable through said opening, a combined anchor retainer and mounting pad supported on said mounting surface and interposed between said support and said mounting surface, said combined anchor retainer and mounting pad having a pocket projecting into said opening and operable to support said anchor in a relatively fixed position during the installation of said assembly with the opposite ends of said anchor in alignment with said shoulder means and a screw connecting said support and said anchor and operable to hold said anchor against said shoulder means and to hold said support against said mounting pad.

\* \* \* \* \*